Figure 1:
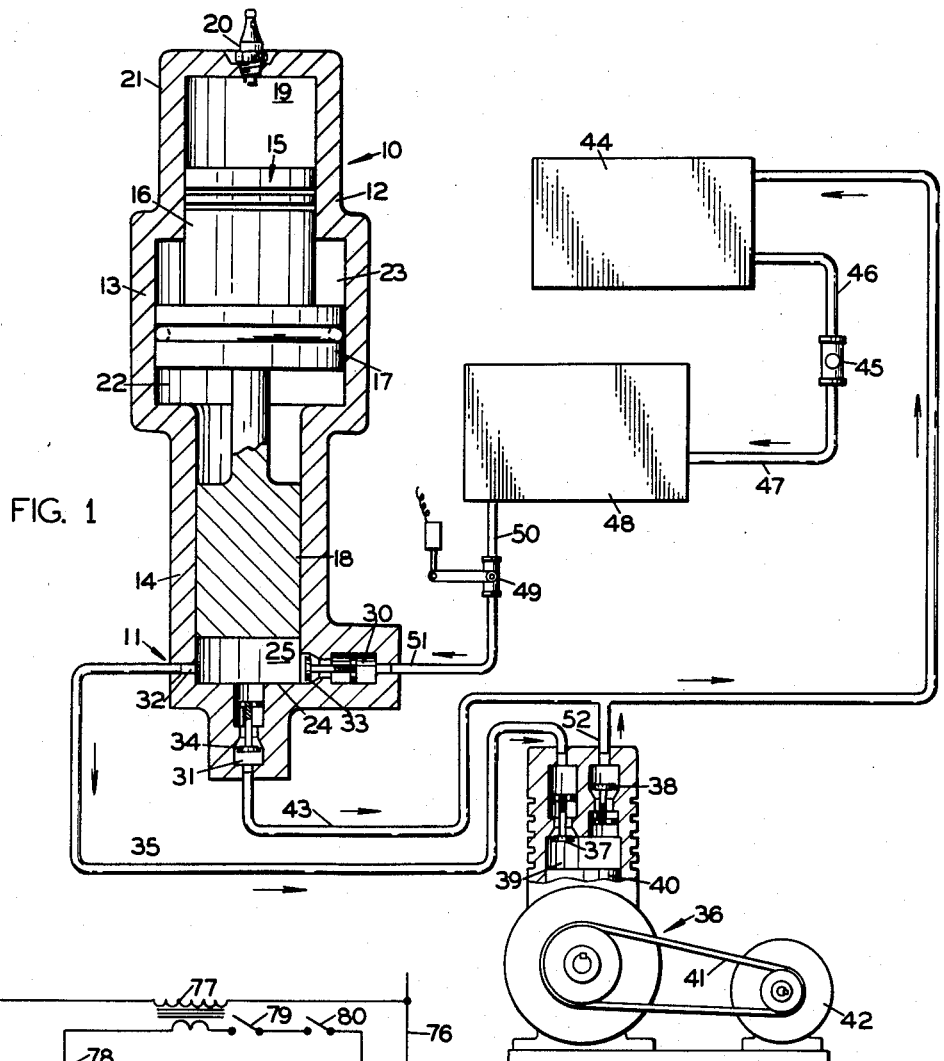

May 24, 1960     J. H. McNINCH, JR., ET AL     2,937,513
FREE-PISTON ENGINE COMPRESSOR
Filed Dec. 30, 1957

INVENTORS
JOSEPH H. McNINCH, JR.
ROLLIN J. McCRORY

BY

ATTORNEY

United States Patent Office  2,937,513
Patented May 24, 1960

2,937,513
FREE-PISTON ENGINE COMPRESSOR

Joseph H. McNinch, Jr., and Rollin J. McCrory, both of Columbus, Ohio, assignors, by mesne assignments, to The Battelle Development Corporation, Columbus, Ohio, a corporation of Delaware Filed Dec. 30, 1957, Ser. No. 705,965

6 Claims. (Cl. 62—323)

This invention relates to a refrigeration system of the compressed-gas type. More particularly, it relates to apparatus of a refrigeration system, in which a gas, such as Freon, is compressed in a reciprocating-piston compressor.

Briefly, in this invention a reciprocating-piston, refrigerant-gas compressor is integrally constructed with a free-piston, internal-combustion engine and the free piston is rebounded on the compression stroke of the engine by the refrigerant gas in the refrigeration system.

The invention includes the combination of a pressure-reducing means in communication with the compression chamber of a compressor, to lower the pressure in this chamber and a valve in the inlet line to the compressor, to control the admission of refrigerant gas at the suction pressure of the refrigeration system. The operation of this combination of apparatus moves the piston in one direction to starting position and in the opposite direction on the starting compression stroke of the engine. Controls are provided to initiate the pressure-reducing means and the valve in proper sequence and timing.

Free-piston engines have many advantages as a source of power and actuation for compressors. Of primary importance is the reduction in weight and noise, in comparison with the more conventional crank-shaft engines. While the reduction in weight is always important, when the engine is to be installed in a building or residence as the source of power for the air-conditioning system, quietness and dependability are of primary importance. By combining a free-piston engine with a compressed-gas refrigeration system, these important advantages are provided in the use of internal-combustion engines for air-conditioning systems.

It is an object of this invention to provide a refrigeration system in which the suction pressure of the system is utilized as a source of rebound energy in the internal-combustion engine of the system. It is a further object to provide a means for starting a free-piston engine in a refrigeration system, in which the suction pressure of the refrigeration system provides the energy for moving the piston on the first compression stroke in the combustion cylinder.

It is the purpose of the invention to provide means for removing the effect of the suction pressure of the refrigeration system from the piston of the engine-compressor to move the piston into starting position. It is yet another purpose to provide means for admitting the refrigerant gas, at suction pressure of the refrigeration system, to the compressor chamber to affect the piston and move the piston on the first intake stroke of the engine.

It is an over-all purpose of this invention to provide a free-piston, internal-combustion-engine refrigeration apparatus which is capable of being automatically controlled, started, stopped and prepared for starting.

To these and other ends, this invention comprises apparatus, the preferred form of which is disclosed in the following description and attached drawings. Although the apparatus and structure are described and shown in detail, refer with particularity to a Freon-gas-refrigeration system for residential air conditioning, it is apparent that this invention should not be limited thereto. Many of the significant details of this invention apply with equal qualification to compressed-gas refrigeration systems in general. The invention may be used for other purposes, where its features are advantageous.

Figure 2:
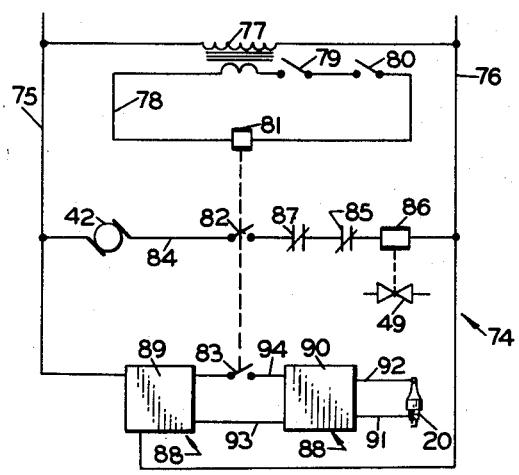

In the drawings:

Fig. 1 is a schematic, sectional, elevational view of the refrigeration apparatus of this invention; and Fig. 2 is a diagram of a typical control circuit and apparatus, which could be used with the refrigeration apparatus of this invention.

Referring to Fig. 1, free-piston engine 10 is integrally constructed with a gas compressor 11.

The engine 10 comprises a combustion cylinder 12 and an auxiliary cylinder 13 of larger diameter. Auxiliary cylinder 13 is connected directly to a compressor cylinder 14 of smaller diameter. A piston 15 comprising a combustor portion 16, a flange portion 17, and a compressor portion 18 is provided within engine-compressor combination 10—11. Combustor portion 16, flange portion 17, and compressor portion 18 are constructed to reciprocate by sliding sealed fit in combustion cylinder 12, auxiliary cylinder 13, and compressor cylinder 14, respectively. In conjunction with combustion cylinder 12, combustor portion 16 provides a combustion chamber 19, which is constructed with ignition means 20 disposed in a head end 21. Flange portion 17 partitions auxiliary cylinder 13 into a pump chamber 22 and a control chamber 23. Compressor cylinder 14 is provided with a closure end 24 which, together with the walls of cylinder 14 and compressor piston 18, forms a compressor chamber 25.

Piston 15 in normal operation reciprocates up and down, or back and forth, as the position of engine 10 may determine, in the manner of the usual and conventional two-stroke cycle, internal-combustion engine. The piston 15 moves between bottom-end position (shown in Fig. 1) and top-end position in which the top of the piston is adjacent to the head end 21 of the cylinder 12. In the normal combustion or power stroke of the engine, previously admitted and compressed fuel, which may be natural gas, is ignited by the igniter 20 and burned. The expanding gases from the combustion process move the piston downward, pumping air from chamber 22 by conventional valve means and apparatus (not shown) to an accumulator for use in the scavenging and combustion operations of the engine. Air may be drawn into control chamber 23 during this combustion stroke.

Compression chamber 25 is provided with an inlet aperture 30, a discharge aperture 31, and an outlet 32. Inlet 30 is constructed with an inwardly opening pressure-responsive valve 33, which may be of conventional design. Discharge aperture 31 is provided with an outwardly opening, pressure-responsive valve 34, which also may be of conventional design.

Outlet 32 is connected by means of a fluid-communication line 35 to a pressure-reducing means, such as a pump, generally indicated as 36 in Fig. 1. Pump 36 may be of conventional design, having pressure-responsive inlet and outlet valves 37 and 38, respectively, in communication with a pump chamber 39. A piston 40 reciprocates in pump chamber 39 through the action of a crank and crankshaft (not shown). The crankshaft may be driven through a belt 41 by an electric motor 42. Fluid-communication line 35 is connected to inlet valve 37 of pump 36.

In the refrigeration system, discharge aperture 31 of compressor 11 is connected by fluid-communication line 43 to condenser 44. Condenser 44 is connected to expansion valve 45 through fluid-communication line 46, Expansion valve 45 is connected through fluid-communication line 47 to evaporator 48. Evaporator 48 is connected at its outlet end to valve 49 through fluid-communication line 50, and valve 49 is connected to inlet 30 by means of fluid-communication line 51.

Valve 49 is preferably of the electrical-solenoid-operated, quick-acting, normally-open type. It should be of a capacity sufficient to admit full line-pressure flow, substantially instantaneously upon actuation to open position.

Outlet valve 38 of pressure-reducing means 36 is connected to discharge line 43 by means of a fluid-communication line 52.

Condenser 44, expansion valve 45, and evaporator 48 are shown connected as in the usual compressed-gas refrigeration system, which may be operated with Freon gas. However, in the usual apparatus the discharge line is connected directly to the discharge outlet of the Freon compressor and the inlet of the "suction" line is connected directly to the inlet of the Freon compressor.

As a matter of descriptive convenience, and for example, evaporator 48 will be considered as the cooling coils of a residential air-conditioning unit, in which the cooling load is about 3 tons of refrigeration.

In this refrigeration system operating on Freon gas, the suction pressure of the inlet gas from evaporator 48 at inlet 30 of compressor 11 is preferably about 50 p.s.i. absolute, and the discharge pressure from aperture 31 to condenser 44 is preferably about 150 p.s.i. absolute. The compressor, therefore, operates through a pressure differential of about 100 p.s.i.

When the free-piston engine-compressor 10—11 is operating in the refrigeration system of the example, valve 49 is open. The Freon is compressed in chamber 25 to a pressure of about 150 p.s.i. Compressed Freon moves through discharge line 43 to condenser 44, where the heat of compression is removed and the gas is condensed to liquid in a constant-pressure heat-exchange operation. The Freon moves through expansion valve 45 and is admitted to evaporator 48, where the expansion process absorbs heat from its surroundings. This heat is conducted through the coil from the inlet air of the air-conditioning unit.

The warmed and expanded Freon gas passes into compressor chamber 25 when valve 33 opens after compressor portion 18 reaches its lowermost position.

As previously described, the combustion cycle of engine 10 moves piston 15 down from top-end position to bottom-end position in the usual two-stroke-cycle engine operation. Near the end of this combustion stroke, exhaust ports in the wall of combustion cylinder 12 are uncovered by combustor portion 16, and the pressure in combustion chamber 19 is rapidly reduced to about atmospheric pressure. When pressure in combustion chamber 19 decreases, the Freon pressure in compressor chamber 25 remains high as the piston 15 continues down by momentum. When the downward kinetic energy is consumed, the piston reverses and starts up, driven by the Freon gas in compressor chamber 25 at discharge pressure. The pressure in chamber 25 immediately falls and soon as it falls below the suction pressure of the refrigeration system, valve 33 opens. Admission of the Freon to chamber 25 at the suction pressure of 50 p.s.i. acts against the end of compressor portion 18, forcing piston 15 upward on the compression stroke of engine 10. The combustion cycle is completed when piston 15 reaches top-end position with a new fuel charge in compressed condition for ignition by igniter 20.

In the operation of free-piston engine-compressor 10—11, the refrigeration compressor gas provides the "rebound" energy for returning the free-piston engine 10 on its intake stroke each time that the piston reaches bottom-end position. The engine operates continuously in the refrigeration cycle, so long as fuel and ignition are provided to engine 10. Valves may be provided in the walls of control chamber 23 and pump chamber 22, to control the operation and timing of the engine, as necessity requires.

In the free-piston engine-compressor refrigeration system for residential air conditioning of the example, it is necessary that means be provided to start and stop the engine when the cooling load on the evaporator is satisfied. In the usual case, this must be done automatically, by means of controls without attention by the occupants of the residence or dwelling. These controls are combined in a manner to provide for sensing the temperature conditions in the area of the space-cooling load and for responding to the sensed temperature conditions, to initiate the operation of engine 10, if necessary, or to stop operation of engine 10, if necessary.

When a portion of the controls sense that the cooling load is satisfied, other controls are actuated to discontinue operation of igniter 20, and free-piston engine-compressor 10—11 stops. Because of the suction pressure of the refrigeration system at the inlet valve 33, which pressure is higher than the pressure in combustion chamber 19 if ignition does not take place, piston 15 always stops at head-end position. Because of normal leakage around combustor portion 16, pressure conditions will not remain correctly constituted for a very long period of time, and the engine cannot be started by re-establishing the operation of igniter 20.

It has been found convenient and necessary to start engine 10 by manipulating piston 15 upward each time that the engine is to be started. Since the engine always stops in the head-end position, piston 15 must be lowered to bottom-end position before it can be manipulated upward on the first starting stroke.

In this invention, when the engine is to be started, motor 42 is operated by means of controls which sense the requirement for cooling at the position of the space-cooling load. Operation of motor 42 actuates piston 40 up and down in chamber 39 of pump 36. Operation of piston 40 reduces the pressure in chamber 39, drawing Freon from chamber 25 through line 35 and outlet 32. The Freon is forced out through line 52 into the discharge line 43 from the compressor 11. As pump 36 is operated, the pressure in chamber 25 is reduced to a value below the pressure in chamber 19, which usually will be below atmospheric. When the pressure in chamber 25 reaches a value less than the pressure in chamber 19, piston 15 will be drawn down from its stopping position to the starting position at bottom end. As soon as piston 15 reaches bottom-end position, valve 49 is rapidly opened and piston 15 is forced upward by the suction pressure of the refrigeration system on the first intake stroke for engine starting.

Provision of the pressure-reducing means 36 connected in a line between outlet 32 and the discharge line 43 for "pumping down" the pressure in chamber 25 is an ingenious solution to a difficult problem in the starting of a free-piston engine-compressor which derives its rebound energy from the refrigerant gas of its associated refrigeration system. By means of the pressure-reducing means, connected as disclosed, the need is absent for complicated apparatus, such as mechanical linkages, or apparatus to pressurize combustion chamber 19. It will be seen that other means of forcing piston 15 down to starting position all involve the provision of additional energy and work to overcome the suction pressure of the refrigeration system, which tends to restrain the movement of piston 15. In the apparatus of this invention, the force forcing and holding the piston up is reduced rather than overcome. Therefore, the apparatus as a whole may be more conveniently compact, lighter in weight, and of lesser capacity than that which would be otherwise required because of higher forces and energy levels. It has been found that in apparatus of the size sufficient to operate a 3-ton air-conditioning system, the pressure in chamber 25 may be reduced in about 15 seconds to a value which will cause piston 15 to move to bottom-end position.

Fig. 2 discloses a typical electrical control circuit for the operation of the apparatus of this invention. In Fig. 2, lines 75 and 76 are opposite sides of a source of alternating electrical potential, between which are connected the various elements of the control circuit, which is designated generally as 74. In control circuit 74, the primary of a transformer 77 is connected between lines 75 and 76. The secondary of transformer 77 provides a low-voltage source of power for an actuator circuit 78 comprising a toggle switch 79, a thermally responsive switch 80, and a multiple-pole relay 81. Relay 81 operates normally open relay switches 82 and 83 which are connected in a starter circuit 84, and the circuit of an ignition unit 88, respectively.

Thermostatic switch 80 is centrally located in the air-conditioned space, and manually operated toggle switch 79 is conveniently located near the apparatus of the refrigeration system. Motor 42 is located adjacent to pressure-reducing means 36, which will usually be connected near free-piston engine compressor 10—11.

Starter circuit 84 comprises motor 42, relay switch 82, a normally closed pressure-operated switch 87, a normally closed contact switch 85, and a solenoid 86 connected in series. Contact switch 85 is located near the bottom of one of the cylinders in the engine compressor 10—11, in a position to be contacted and operated when piston 16 is moved to bottom-end position for starting.

Pressure-operated switch 87 is located in operative communication with one of the chambers of the engine compressor 10—11, which reaches a pressure higher than atmospheric during normal engine operation. Switch 87 is provided with time-delay means on the return to closed position. The time delay provided is greater than the time of a cycle of reciprocation of the engine compressor 10—11, so that switch 87 will not operate to closed position during the normal operation of the engine.

Switch 85 is located at a position beyond the normal stroke of reciprocation of the piston 16 at bottom-end position and is only contacted when piston 16 is drawn down to starting position which is further down than normal bottom-end position.

Ignition circuit of unit 88 comprises a power supply 89, which is connected between lines 75 and 76, and a spark generating unit 90, which is connected to ignitor 20 by lines 91 and 92. Power supply 89 and spark generator 90 are connected by lines 93 and 94 the latter of which contains relay switch 83.

Operation of the entire refrigeration system by the controls when connected as shown in circuit 74 is as follows:

With lines 75 and 76 connected to a source of alternating electrical potential and manual toggle switch 79 in the closed position, when temperature conditions reach a predetermined upper limit, thermostatic switch 80 closes. The closing of thermostatic switch 80 energizes relay 81 which closes relay switch 82. The closing of relay switch 82 completes circuit 84, operating motor 42, and closing valve 49.

The operation of motor 42 actuates pressure-reducing means 36 to reduce the pressure in chamber 25, causing piston 18 to move to starting position. The arrival of piston 18 at starting position in cylinder 14 opens switch 85. The opening of switch 85 breaks circuit 84, stopping motor 42, and opening valve 49.

As the time relay 81 is energized, relay switch 83 is closed, activating the ignition unit 88 which provides a spark at the electrodes of ignitor 20, whenever piston 16 arrives at a proper position on the compression stroke.

On the opening of valve 49, piston 16 is moved quickly upward and a spark is generated at the ignitor 20. On the upward stroke of piston 16 pressure-responsive switch 87 is opened by increasing pressure in the chamber to which it is connected.

If the engine starts on the first compression stroke, pressure-responsive switch 87 is held open by the time delay between high-pressure pulsations, and circuit 84 remains open allowing the engine to operate continuously with valve 49 normally open and motor 42 shut off.

In the event that the engine does not start on the first compression stroke or for any reason the engine stops while thermostatic switch 80 is closed, switch 87 returns to closed position after the time delay and after circuit 84 is closed. Closing of circuit 84 repeats the starting cycle. When the cooling load is satisfied, thermostatic switch 80 opens which de-energizes relay 81, breaking the ignition circuit to relay switch 83, and causing the engine to stop.

Through provision of the controls connected in control circuit 74, the free-piston engine-compressor 10—11 is conveniently automatically operable, without attention from the occupants of the air-conditioned space.

It will be understood, of course, that while the forms of the invention herein shown and described constitute the preferred embodiments of the invention, it is not intended herein to illustrate all of the possible equivalent forms or ramifications of the invention. It will also be understood that the words used are words of description, rather than of limitation, and that various changes, such as changes in shape, relative size, and arrangement of parts may be substituted without departing from the spirit or scope of the invention herein disclosed.

What is claimed is:

1. In a compressed-gas refrigeration apparatus, having a condenser, an expansion valve, and an evaporator operatively connected with a compressor to produce a cooling effect at said evaporator; a free-piston engine-compressor having a reciprocating piston, in which the piston of the engine is connected directly to the piston of the compressor, comprising: a frame having a combustion cylinder and a compressor cylinder uniaxially positioned connected by an auxiliary cylinder of larger diameter having a common axis with said combustion and compression cylinders; a piston constructed to reciprocate in said frame, having a combustor portion slidingly fitted in said combustion cylinder, a flange portion slidingly fitted in said auxiliary cylinder and a directly connected compressor portion slidingly fitted in said compressor cylinder; fuel-supply means into said combustion cylinder; ignition means in the head end of said combustion cylinder; pressure-responsive discharge valve means from said compressor cylinder, and pressure-responsive inlet valve means to said compressor cylinder; and a connection between said evaporator and said pressure-responsive inlet means, said pressure-responsive inlet valve means operative to open after said combustor portion leaves bottom-end position in the stroke of said piston and the pressure in said compressor cylinder decreases to a value less than the compressed-gas pressure in said evaporator.

2. A compressed-gas refrigeration apparatus, comprising: a refrigeration gas compressor integrally connected to and driven by a free-piston internal-combustion engine; a condenser in communication with the discharge of said compressor; an expansion valve connected to the outlet from condenser; an evaporator connected to said expansion valve; communication means between said evaporator and the inlet to the compression chamber of said compressor; a valve in said communication means; pressure-reducing means in communication with said compression chamber; and means operatively connected to said valve and said pressure-reducing means, to operate said pressure-reducing means followed by said valve sequentially, to start said engine.

3. A compressed-gas refrigeration apparatus, comprising: a refrigeration gas compressor integrally connected to and driven by a free-piston internal-combustion engine; a condenser in communication with the discharge of said compressor; an expansion valve connected to the outlet from said condenser; an evaporator connected to said expansion valve; communication means between said evaporator and the inlet to said compressor; a quick-acting valve in said communication means; a fluid pressure-reducing pump in communication with the compression chamber of said compressor, and control means to operate said pump, reducing the pressure in said chamber, moving the compressor and engine piston into starting position, and to open said valve, moving said piston on the starting stroke of the engine.

4. In a compressed-gas refrigeration apparatus including a refrigeration gas compressor integrally connected to and driven by a free-piston engine and have a compression chamber, a condenser in communication with the discharge of said compression chamber, an expansion valve connected to the outlet from said condenser, an evaporator connected to said expansion valve, and communication means between said evaporator and the inlet to the compression chamber of said compressor; a quick-acting valve in said communication means; means for reducing the pressure in said compression chamber to a value less than the pressure in the combustion chamber of said engine, moving said piston to bottom-end position; and means for opening said valve, rapidly raising the pressure in said compressor chamber to a value greater than the pressure in the combustion chamber, rapidly moving said piston to top-end position, starting said engine.

5. In a compressed-gas refrigeration apparatus including a refrigeration gas compressor integrally connected to and driven by a free-piston internal-combustion engine and having a compression chamber, a condenser in communication with the discharge of said compression chamber, an expansion valve connected to the outlet from said condenser, an evaporator connected to said expansion valve, and communication means between said evaporator and the inlet to the compression chamber of said compressor; a quick-action valve in said communication means; and an externally powered pressure-reducing-pump means in communication with the discharge from said compressor at the high-pressure outlet of said pump and in communication with said compressor chamber directly at the low-pressure inlet of said pump; said pressure-reducing means operating before the opening of said quick-acting valve to reduce the pressure in said compression chamber to a value less than the pressure in the combustion chamber of said engine moving said piston to bottom-end position, and means responsive to the movement of said piston to bottom-end position for opening said valve to rapidly raise the pressure in said compression chamber to a value greater than the pressure in the combustion chamber of said engine, rapidly moving said piston to top-end position, starting said engine.

6. In a compressed gas refrigeration apparatus, having a condenser, an expansion valve, and an evaporator operatively connected with a compressor to produce a cooling effect at said evaporator; a free piston engine compressor having a reciprocating piston, in which the piston of the engine is connected directly to the piston of the compressor comprising: a frame having a combustion cylinder and a compressor cylinder uniaxially positioned; a piston constructed to reciprocate in said frame, having a combustor portion slidingly fitted in said combustion cylinder and a directly connected compressor portion slidingly fitted in said compressor cylinder; fuel-supply means into said combustion cylinder; ignition means in the head end of said combustion cylinder; pressure-responsive discharge valve means from said compressor cylinder, and pressure-responsive inlet valve means to said compressor cylinder; and a connection between said evaporator and said pressure-responsive inlet means, said pressure-responsive inlet valve means operative to open after said combustor portion leaves bottom-end position in the stroke of said piston and the pressure in said compressor cylinder decreases to a value less than the compressed-gas pressure in said evaporator.

References Cited in the file of this patent

UNITED STATES PATENTS

| | | |
|---|---|---|
| 2,545,861 | Sallou | Mar. 20, 1951 |
| 2,751,758 | Parrish | June 26, 1956 |
| 2,782,613 | Addie | Feb. 26, 1957 |

FOREIGN PATENTS

| | | |
|---|---|---|
| 272,504 | Great Britain | Dec. 7, 1928 |